United States Patent [19]

Lee

[11] Patent Number: 5,218,634
[45] Date of Patent: Jun. 8, 1993

[54] RINGER ASSEMBLY
[75] Inventor: Peter Lee, Huntington Beach, Calif.
[73] Assignee: American Phone Products, Inc., Huntington Beach, Calif.
[21] Appl. No.: 529,668
[22] Filed: May 29, 1990
[51] Int. Cl.[5] .............................. H04M 1/00
[52] U.S. Cl. ...................... 379/375; 379/373; 379/441; 379/442
[58] Field of Search ............... 379/375, 373, 428, 436, 379/442, 386, 441; 340/384 R; 381/159

[56] References Cited

U.S. PATENT DOCUMENTS

| Re. 31,398 | 9/1983 | Bush et al. | 379/375 |
|---|---|---|---|
| 3,467,788 | 7/1966 | Why et al. | 379/375 |
| 3,864,532 | 2/1975 | Van Der Plaats et al. | 379/375 X |
| 4,157,459 | 6/1979 | Bush et al. | 379/373 |
| 4,251,807 | 2/1981 | Hofer et al. | 340/384 R |
| 4,278,851 | 7/1981 | Takaya | 340/384 R |
| 4,409,588 | 10/1983 | Hofer et al. | 340/384 R |
| 4,413,253 | 11/1983 | Hofer et al. | 340/384 R X |
| 4,574,272 | 3/1986 | Brown | 340/384 R |
| 4,602,245 | 7/1986 | Yang et al. | 340/384 R |
| 4,604,606 | 8/1986 | Sweany | 340/384 R X |
| 4,728,933 | 3/1988 | Mazza | 379/375 X |
| 4,823,110 | 3/1989 | Borward et al. | 340/384 R X |
| 4,845,748 | 7/1989 | Bohannon | 379/428 X |

FOREIGN PATENT DOCUMENTS

| 0172465 | 8/1986 | Japan | 379/375 |
|---|---|---|---|
| 0172466 | 8/1986 | Japan | 379/375 |
| 0172467 | 8/1986 | Japan | 379/375 |

Primary Examiner—James L. Dwyer
Assistant Examiner—M. Sheheta
Attorney, Agent, or Firm—G. Donald Weber, Jr.

[57] ABSTRACT

A ringer assembly which is used in conjunction with a telephone system. The ringer assembly is especially useful for hearing impaired individuals although not limited thereto. The ringer assembly includes a unique housing for mounting the ringer apparatus so as to improve and enhance the acoustical operation thereof.

15 Claims, 1 Drawing Sheet

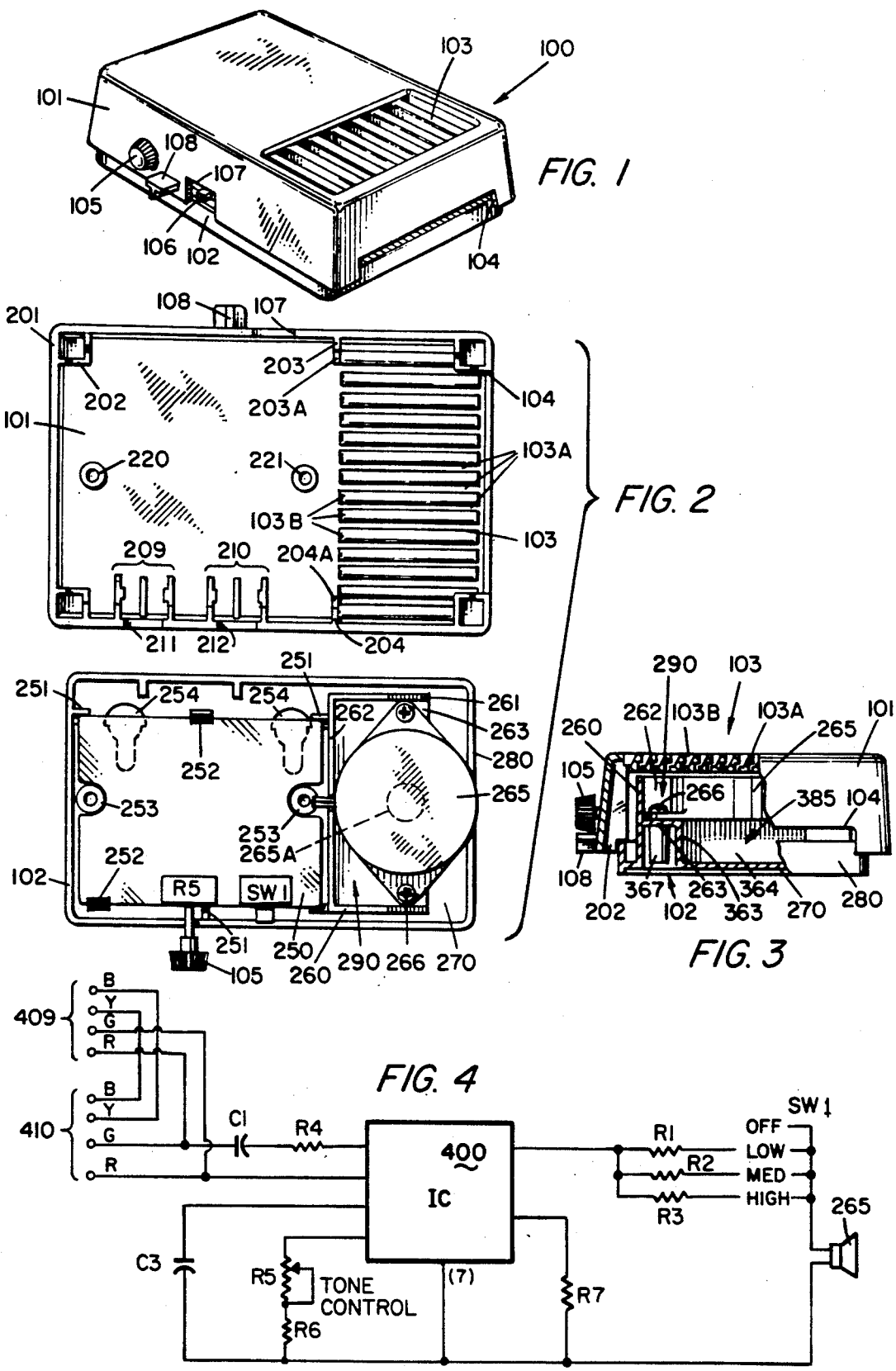

RINGER ASSEMBLY

BACKGROUND

1. Field of the Invention

This invention is directed to telephone accessory equipment, in general, and to an improve ringer assembly for use therewith, in particular.

2. Prior Art

One of the most universally useful and generally available instruments or tools for both business and everday living is the telephone. Telephones have been in existence for many years.

Recently, it has become fashionable to adapt telephone systems and equipment for easier and more productive use by handicapped or disabled persons. The main thrust of these improvements is to adapt the telephone for use by those who are hearing impaired.

There are many such innovations and/or adaptations known in the art. For example, there are many known devices which are used to amplify the sound which is transmitted through the telephone system. This amplification is intended to assist the user in communicating across the telephone line. Of course, other systems such as TTY and the like are used to permit the hearing impaired persons to communicate by means of a printout, displays at the respective ends of the telephone line, or the line.

Some additional adaptations and/or accessories are rather more mundane but do enhance the usage of the telephone systems for the hearing impaired. For example, to indicate that a call is incoming, many telephone systems use lights mounted directly on the telephone instrument or attached as accessories thereto. Other approaches are directed to using loud ringers or the like.

However, these known accessories generally have the disadvantage in that they are expensive, bulky, annoying, difficult to implement and the like. It is, therefore, desirable to achieve the same results with more cost efficient, more esthetically pleasing products.

PRIOR ART STATEMENT

Applicant has not made a detailed, formal patentability search.

SUMMARY OF THE INSTANT INVENTION

This invention is directed to a telephone ringer assembly which enhances the operation thereof. The device includes appropriate circuitry which permits the ringer to be adjusted in terms of loudness and tone. The ringer includes, in this instance, a suitable sound producing device such as piezoelectric transducer or the like. The transducer (or other acoustical signal generating device) is uniquely mounted in a specially designed housing. The housing includes a specific chamber for receiving the transducer. The housing also includes appropriate openings therein so that the signal generated by the transducer can escape and be heard. The housing and the aforesaid chamber are arranged to receive the transducer in the inverted position. This combination operates to amplify, resonate and reverberate in order to enhance the sound signal generated by the transducer. Also, a relatively small device can generate a vastly enhanced signal to assist the hearing impaired.

BRIEF DESCRIPTION OF THE DRAWINGS

FIG. 1 is an isometric view of a preferred embodiment of the invention.

FIG. 2 is an exploded view of the ringer assembly of the invention with the interiors of the top and bottom portions of the housing exposed.

FIG. 3 is a partially broken away, partially cross-sectional view from one end of the apparatus of the instant invention.

FIG. 4 is a schematic diagram of the circuitry used to control the operation of the instant invention.

DESCRIPTION OF THE PREFERRED EMBODIMENT

Referring now to FIG. 1, there is shown an isometric view of a preferred embodiment of the instant invention. The ringer assembly 100 includes an upper housing 101 and a lower housing 102 The upper housing 101 is adapted to rest upon and, in this instance, overlap the lower housing 102. A louvered grid 103 is provided in the upper surface of upper housing 101. The louvered grid 103 can comprise a plurality of parallel strips of material separated by a plurality of spaces. The strips can be relatively narrow, substantially parallel, and extending across a space in the upper housing 101. The strips may be rectilinear strips, trapezoidal shaped strips or the like.

In addition, the upper housing 101 includes a cutout portion 104 in the lower edge adjacent one end thereof. This cutout portion is adapted to provide a space or opening between the upper and lower housings adjacent to the transducer (described infra). A tone control unit includes a knob 105 which extends outwardly from the upper housing 101. The tone control unit comprises a potentiometer (as described subsequently hereinafter) which includes a rotatable shaft to which the knob 105 is attached.

A switch 106 is also provided in the unit. The switch 106 is accessed through an appropriate aperture 107 in the side of upper housing 101. Of course, the switch 106 and the knob 105 can be located at any convenient position on the apparatus.

An optional lip 108 also extends outwardly from one side of the housing 101. The lip operates to protect the knob 105 of the potentiometer and may be omitted if so desired.

It should be understood that appropriate modular phone jacks are provided in the housing 100. These phone jacks are not shown in FIG. 1 but are shown in other Figures. Of course, the phone jacks can be placed at any appropriate location on the housing and can be reversed with the switch 106 and the knob 105.

Referring now to FIG. 2, there is shown an exploded (or opened) representation of the housing 100. In particular, a top view of the interior portion of lower housing 102 is provided At the same time, an inside view of upper housing 101 is provided. In particular, the upper housing 101 is, effectively, pivoted around the common side to show the relative relationship of the parts.

The grid 103 is shown in somewhat greater detail and comprises a plurality of strips 103A which span the transducer mounting area which is described in greater detail hereinafter. Between the strips 103A are spaces or openings 103B which pass through the upper housing 101.

Each of the corners of the upper housing 101 includes a corner support bracket 201. Each of the support brackets 201 is formed in a corner of the upper housing 101 and includes a stepped portion 202 which is adapted to receive the corner of the lower housing 102. The aperture 107 is provided to permit access to switch 106. The lip 108 is provided in order to protect knob 105 as noted.

In addition, a pair of intermediate support struts 203 and 204 are provided between the two ends of the upper housing 101. The brackets 203 and 204 include stepped portions 203A and 204A to receive and support the edge of the lower housing 102 (similar to the step 202 in the corner bracket 201).

In addition, a pair of bracket components 209 and 210 are provided adjacent one side of the lower housing 101. The bracket components are provided to receive and support modular phone jacks (not shown). In particular, the phone jacks are placed between the end brackets of the combination brackets 209 and 210 and rest upon the median bracket thereof. The phone jacks (not shown) is also mounted in the apertures 211 and 212 whereby connections can be made thereto.

A pair of bosses 220 and 221 are formed in the upper housing 101 and extend from the inner surface thereof. The bosses 220 and 221 are adapted to receive screws or other fastening devices whereby the lower housing 102 is connected to the upper housing 101.

A circuit board 250 is shown mounted to the lower housing 102. The circuitry (see FIG. 4) is placed thereon in accordance with typical circuit board manufacturing techniques. The circuit board 250 rests on the brackets 251, a plurality of which are shown. In addition, a plurality of retaining clips 252 are also shown. The clips can be flexible or resilient arms which hook over the circuit board and latch the circuit board in place when it is placed on the apparatus. A pair of screw mounting units 253 are provided, as well. These units 253 are aligned with the bosses 220 and 221 to provide the mounting apparatus.

A pair of keyhole-shaped apertures 254 are provided at the bottom surface of lower housing 102. These apertures are used to provide a mounting for the housing 100, especially if wall mounting is desired.

An acoustical chamber is formed in the housing by means of the three integrally formed walls 260, 261 and 262. The three walls are joined together to form a U-shaped chamber 290. A planar shelf 263 is joined to the three walls or sides 260, 261 and 262. The shelf 263 is, generally, U-shaped, as well, and includes an open portion therethrough.

An acoustical signal generator 265 such as but not limited to a piezoelectric transducer is mounted to the shelf 263 by suitable fasteners 266 such as rivets, bolts, screws or the like. It is noted that the transducer 265 is mounted (with the opening or throat thereof facing downwardly) into the chamber 290 formed by the walls 260, 261 and 262 together with the inside surface of the outer wall of the housing 102 and the inside surface of the bottom 270 of the lower housing 102. Thus, any sound generated by the transducer 265 will be projected downwardly (in this embodiment) into the cavity 385 (see FIG. 3). The sound produced in cavity 385 will also reverberate with chamber 290. This configuration causes a significant amplification of the sound generated by the transducer 265.

As shown in FIG. 2, the back or closed portion of the transducer 265 faces away from the grid 103. This is contrary to the normal construction of a sound generator 100.

Referring now to FIG. 3, there is shown a partially broken away, partially sectioned, end view of the apparatus 100. The upper housing 101 is mounted to the lower housing 102. The corners of the upper housing 101 rest on the corner support brackets 202. The grid 103 includes the straps 103A and the apertures 103B. The transducer 265 is mounted to the U-shaped shelf 263 by means of screws 266 which are inserted into the receptical 367. The shelf 263 is connected to the floor 270 of the lower housing 102 by vertical walls 363 and 364. A complementary side wall similar to wall 363 is provided at the other side of the unit. The walls 363 (and complement) and 364 together with the floor 270 and the exterior wall 280, form a cavity 385. Chamber 385 communicates with the chamber 290 formed above the shelf 263 so that any sound generated by transducer 265 echoes, reverberates and resonates therein. The sound is, therefore, amplified before it emanates from the housing through grid 103, cutout portion 104, and the gap between upper housing 101 and lower housing 102 around the chamber/cavity area. Sounds coming through opening 104 and the gap tend to reflect from the surface on which the assembly is mounted to thereby further enhance the loudness of the sound.

Thus, a higher intensity, volume and/or amplitude signal can be generated by transducer 265 through the means of the amplification chambers established in the housing.

Referring now to FIG. 4, there is shown a schematic diagram of the circuitry used in the instant invention. In particular, two pairs of plural electrical connections are shown. These connections 409 and 410 represent the electrical connections of the phone jacks which are mounted in the brackets 209 and 210 shown in FIG. 2. The connections are arranged to permit proper operation of the unit by installation thereof.

The electrical connections between connections 409 and 410 are arranged to permit uninterrupted service in the telephone line and, as well, appropriate operation of the ringer circuit. In particular, the ring line connections are supplied to the intergrated circuit device 400 which can be an amplifier device which operates directly from the ringer's voltage from the telphone line. In particular, one of the ring lines is connected directly to the circuit 400 while the other ring line is connected to circuit 400 via the coupling network comprising capacitor C1 and resistor R4.

The output of the circuit 400 is connected to the transducer 265 which is shown in FIGS. 1 through 3. In particular, the transducer 265 is connected to the integrated circuit via the switch SW1 which, in this embodiment, is a 4-position switch. In one of the positions, the transducer (and, thus, the ringer) is turned OFF. That is, switch SW1 is connected to the OFF position wherein the transducer 265 is disconnected from circuit 400. In the LOW, MED and HIGH positions, the switch and, thus, transducer 265 are connected to circuit 400 via the resistors R1, R2, or R3, respectively.

The other side of the transducer 265 is returned to the circuit 400 at the common terminal 7 which is equivalent to a system ground. Terminating resistor R7 is connected from the common terminal to an other terminal on the circuit 400.

A tone control circuit comprising resistors R5 and R6 in parallel with the stray capacitance is connected to circuit 400 adjusting variable resistor R5 is used to adjust the frequency of the tone circuit. A DC storage capacitor C3 is connected around the tone control circuit. It should be recognized that the tone control potentiometer R5 is connected to and controlled by knob 105 in FIG. 1.

In operation, the ringer assembly 100 is connected into the telephone lines by typical modular interconnections at contacts 409 and 410. When a ring signal is applied, the circuit 400 operates thereon and provides the appropriate signal to the transducer 265. The amplitude of the signal applied to the transducer 265 is a function of the position of switch SW1. Thus, the output signal produced 265 can be low, medium or high (or off) as decided by switch SW1. Likewise, the tone of the signal supplied by the transducer 265 can be altered by properly adjusting variable resistor R5.

In any event, the transducer 265 produces an audible signal. The audible signal is projected downwardly because of the mounting of the transducer 265 in the assembly 100. The signal is produced in the cavity 385 and reverberates and echoes therein whereupon it is amplified and, as well, reverberates in the chamber 290 which surrounds the transducer 265. The enhanced sound ultimately escapes through the grid 103, the cutout 104 and the gaps between upper housing 101 and lower housing 102. By properly mounting the transducer 265 to project the sound downwardly into the chamber 385 and within chamber 290, rather than directly through grid 103, an enhanced and amplified sound signal is produced.

Thus, there is shown and described a unique design and concept of a improved ringer assembly. The particular configuration shown and described herein relates to a latching configuration. While this description is directed to a particular embodiment, it is understood that those skilled in the art may conceive modifications and/or variations to the specific embodiments shown and described herein. Any such modifications or variations which fall within the purview of this description are intended to be included therein, as well. It is understood that the description herein is intended to be illustrative only and is not intended to be limitative. Rather, the scope of the invention described herein is limited only by the claims appended hereto.

I claim:

1. A telephone accessory comprising,
a sound producing device,
a housing surrounding said sound producing device,
said housing includes a cover and a base,
an acoustical structure mounted to said base,
said acoustical structure includes a chamber and a cavity therein,
said sound producing device mounted within said chamber and adjacent to said cavity
whereby said cavity is disposed to receive the sound from said sound producing device so that said cavity and said chamber interact to produce enhanced resonance of sound produced by said sound producing device,
said cover mounted to said base so that a gap exists between said base and said cover around the perimeter of said housing whereby sound can be emitted through said gap,
said cover includes at least one aperture therein adjacent to said sound producing device whereby sound can be emitted through said aperture, and
electrical means for connecting said sound device to an existing telephone system.

2. The accessory recited in claim 1 wherein,
said sound producing device is directional.

3. The accessory recited in claim 1 wherein,
said electrical means includes volume control means for adjusting the volume of the sound produced by said sound producing device.

4. The accessory recited in claim 1 wherein,
said electrical means includes tone control means for adjusting the tone of the sound produced by said sound producing device.

5. The accessory recited on claim 4 wherein,
said sound producing device comprises a piezoelectric transducer.

6. The accessory recited in claim 1 including,
at least one telephone jack connected to said electrical means and mounted in said housing.

7. The accessory recited in claim 6 wherein,
said electrical means includes an amplifier circuit.

8. The accessory recited in claim 1 wherein,
said cover includes a cutout portion in one edge thereof adjacent to said sound producing device whereby sound can be emitted through said cutout portion.

9. The accessory recited in claim 1 wherein,
said chamber is formed by at least three intersecting planar members joined to said base of said housing and disposed above said sound producing device.

10. The accessory recited in claim 1 wherein,
said cavity is formed by at least three intersecting planar members joined to said base of said housing and disposed below said sound producing device.

11. The accessory recited in claim 1, wherein,
said aperture is disposed above said sound producing device.

12. The accessory recited in claim 1 wherein,
said acoustical structure is integrally formed with said base.

13. A telephone accessory comprising,
a directional sound producing device,
a housing surrounding said sound producing device,
said housing includes a cover and a base,
electrical means for connecting said sound device to an existing telephone system,
said housing includes a cavity formed therein on said base and adjacent to said sound producing device,
said cavity disposed to receive the sounds from said sound producing device,
said housing includes a chamber formed therein adjacent to said cavity,
said sound producing device mounted within said chamber,
said cavity and said chamber arranged to interact to produce enhanced resonance of any sounds produced by said sound producing device,
said cover includes a cutout portion in one edge thereof adjacent to said sound producing device whereby sound can be emitted through said cutout portion,
said cavity is formed by at least three intersecting planar members joined to an inner surface of said housing and disposed below said sound producing device.

14. The accessory recited in claim 13 wherein,
said cover and said base are detachably mounted to each other.

15. The accessory recited in claim 13, wherein,
said electrical means includes a printed circuit board mounted to said base.

* * * * *